United States Patent [19]
Lee et al.

[11] Patent Number: 5,682,451
[45] Date of Patent: Oct. 28, 1997

[54] DEVICE WITH INTERNAL FEATURES FOR ROTATIONAL ALIGNMENT OF NON-CYLINDRICALLY SYMMETRICAL OPTICAL ELEMENTS

[75] Inventors: Nicholas A. Lee, Woodbury, Minn.; Daniel V. Attanasio, Clinton, Conn.; Gordon D. Henson, Lake Elmo, Minn.; Grieg A. Olson, Austin, Tex.

[73] Assignee: Minnesota Mining and Manufacturing Company, St. Paul, Minn.

[21] Appl. No.: 448,120

[22] Filed: May 23, 1995

[51] Int. Cl.$^6$ .................................................. G02B 6/36
[52] U.S. Cl. .............................. 385/78; 385/56; 385/60
[58] Field of Search .......................... 385/78, 85, 60, 385/58, 56

[56] References Cited

U.S. PATENT DOCUMENTS

| | | |
|---|---|---|
| 4,792,205 | 12/1988 | Yin et al. . |
| 4,907,853 | 3/1990 | Hiratsuka . |
| 5,016,970 | 5/1991 | Nagase et al. . |
| 5,142,598 | 8/1992 | Tabone . |
| 5,146,525 | 9/1992 | Tabone . |
| 5,212,752 | 5/1993 | Stephenson et al. . |
| 5,212,753 | 5/1993 | Maranto . |
| 5,216,733 | 6/1993 | Nagase et al. . |
| 5,321,784 | 6/1994 | Cubukciyan et al. . |

FOREIGN PATENT DOCUMENTS

| | | | |
|---|---|---|---|
| 0 104 882 | 4/1984 | European Pat. Off. | .......... G02B 7/26 |
| 0 123 134 | 10/1984 | European Pat. Off. | .......... G02B 7/26 |
| WO 94/19716 | 9/1994 | WIPO | .............. G02B 6/36 |

*Primary Examiner*—John D. Lee
*Assistant Examiner*—Yisun Song
*Attorney, Agent, or Firm*—Gary L. Griswold; Walter N. Kirn; H. Sanders Gwin, Jr.

[57] ABSTRACT

The present invention is an optical fiber connector with an internal structure which allows the polarization axis of an optical element to be freely rotated and fixed with respect to an rotational orientation-indicating reference on an external surface of the connector. The reference then provides an external physical indication of the spatial direction of the birefringence axes of the optical element.

50 Claims, 5 Drawing Sheets

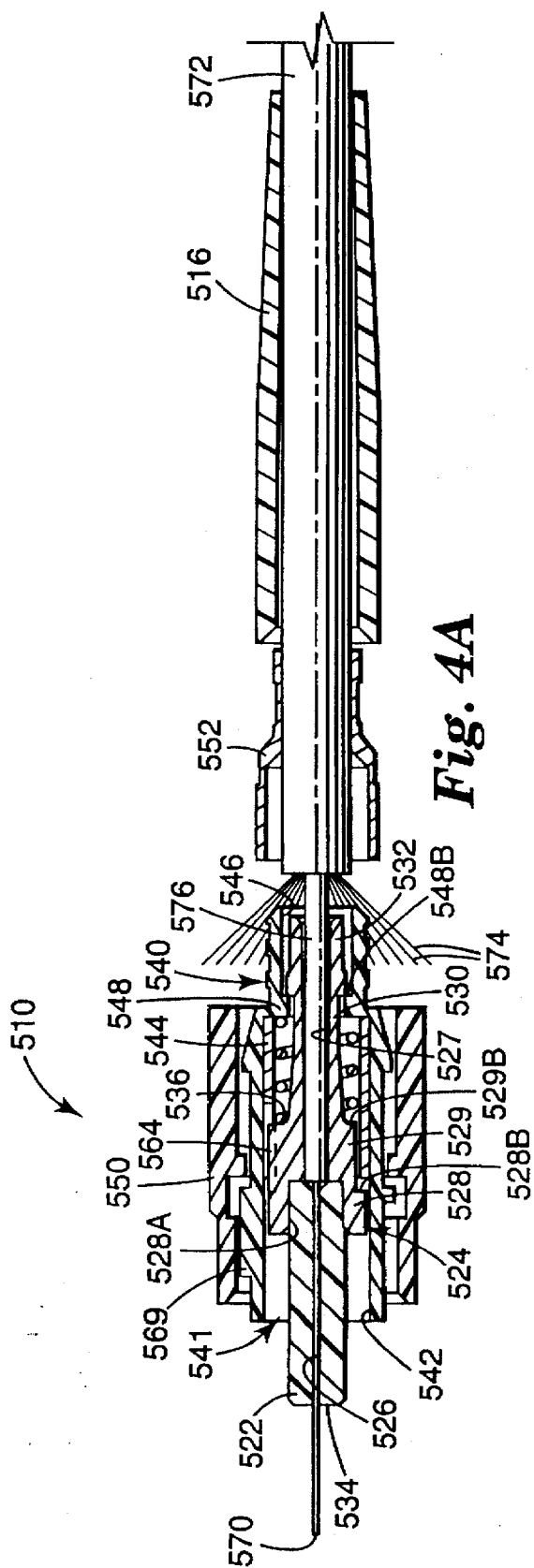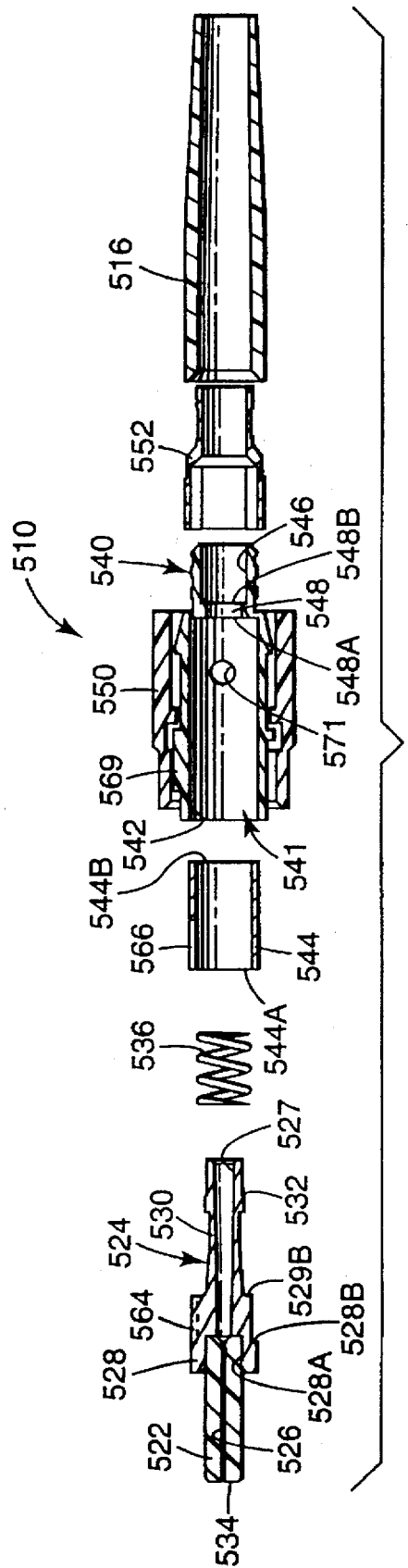

DEVICE WITH INTERNAL FEATURES FOR ROTATIONAL ALIGNMENT OF NON-CYLINDRICALLY SYMMETRICAL OPTICAL ELEMENTS

BACKGROUND OF THE INVENTION

1. Field of the Invention

The present invention relates to connectors for use with non-cylindrically symmetrical optical elements, which transmit, emit or receive polarized light. More particularly, the present invention relates to a connector which maintains the polarization of light transmitted between connected optical elements, particularly optical fibers. Even more particularly, the present invention relates to an optical fiber connector with an internal structure which allows the polarization axis of an optical fiber to be freely rotated and rotationally fixed with respect to a rotational orientation-indicating reference on the connector. The reference, which is preferably on the exterior of the connector, then provides a physical indication of the spatial direction of the birefringence axes of the optical fiber. When the connector of the invention is utilized to connect the optical fiber to another non-cylindrically symmetrical optical element, this external indication facilitates interconnection of the optical elements without misalignment of their polarization axes.

2. Description of Related Art

Optical elements, such as optical fibers, laser diodes and other light sources, polarizers, lenses, beam splitters and the like, are presently in wide use, particularly for high speed communication and data transmission. Connectors may be used to non-permanently connect, disconnect and reconnect the optical elements incorporated into an optical communication network, while splices may be used to permanently connect the network elements. The present application is directed to connectors, which may be easily coupled and uncoupled to allow multiple, non-permanent connection and reconnection of optical elements.

Many such connector designs are in present use. As explained in detail in U.S. Pat. No. 5,321,784, standardized connector designs used in telecommunications applications include the ST connector, the SC connector, and the FC connector. Regardless of the design selected for a particular application, alignment of the terminal ends of the connected optical elements is critical to maintain the signal strength as the light passes through the connection. To connect standard telecommunications grade optical elements, such as optical fibers (which essentially have cylindrical symmetry), the fibers must be supported and oriented both longitudinally and transversely to minimize attenuation of the light signal passing through the fiber connection. As is well known in the art, this is accomplished by optimizing fiber positioning to ensure minimum transverse and longitudinal offset between the fiber cores.

In contrast to the optical fibers utilized in the telecommunications industry, some optical fibers are non-cylindrically symmetrical. They may have non-circular cross sections, or may simply have performance that depends on their rotational orientation. Some non-cylindrically symmetrical fibers are constructed so that they are birefringent, that is, light of different polarizations will have different propagation characteristics within the fiber. For example, polarization maintaining (PM) and polarizing (PZ) fibers have a non-cylindrically symmetrical internal structure designed to maintain the polarization of the light in the fiber. Such fibers typically have two transverse axes associated with this polarization birefringence.

If plane polarized light is launched into the fiber so its plane of polarization coincides with a transverse axis of the fiber, the polarization of the light is maintained as the light propagates down the length of the fiber. When making a connection between two non-cylindrically symmetrical optical fibers, it is important to rotationally align the transverse axes of the two fibers accurately so that the polarization state will be preserved.

A measure of the performance in a polarization maintaining fiber optic system is polarization crosstalk, sometimes referred to as extinction ratio, which is defined as the ratio of the optical power of the light in the undesirable polarization state to the power of the light in the preferred polarization state. This ratio is related to the rotational orientation offset:

$$\frac{P_y}{P_x} = \tan^2(\beta),$$

where $\beta$ is the angle between the axes of the two fibers being connected, $P_x$ is the optical power in the preferred polarization state, and $P_y$ is optical power in the orthogonal polarization state.

The value of the polarization crosstalk is commonly expressed in dB:

$$\text{Polarization Crosstalk (dB)} = 10\log\left(\frac{P_y}{P_x}\right)$$

It is desirable to have a polarization crosstalk of less than −30 dB. This level of performance requires alignment accuracy within about 2°. Unfortunately, there are also many other factors that adversely affect the polarization crosstalk. Therefore, in practice, it is desirable to have rotational orientation accuracy of better than about 1°. Such high precision is very difficult to achieve with conventional connector designs.

Two principal existing optical fiber connector designs which have been used primarily for standard cylindrically symmetrical telecommunications fibers, FC and SC, are also generally suitable for use as connectors for non-cylindrically symmetrical fiber elements, such as, for example, PZ or PM optical fibers. Both these connector types normally include a projection or key on the connector which mates with a detail on the associated adapter, thus fixing the rotational alignment of the connector relative to the adapter and thus to a second connector. It is this control of rotational alignment of the connectors which makes SC and FC connectors suitable candidates for connectors of polarization-controlling optical fibers.

Some known SC and FC connector designs have limited rotational orientation capability. However, these designs are intended merely to reduce excess loss by the accommodation of eccentricity of fiber cores with respect to the connector bodies in the connection. For example, Nagase et al. in U.S. Pat. No. 5,016,970 discuss the problem of optical fiber misalignment and provide symmetrically opposed keyways in a ferrule body as a means of alignment. These keyways interlock with symmetrically opposed keys formed in a plug housing which receives the ferrule. The keys and corresponding keyways allow two possible orientations of the optical fiber in the plug housing. The alternate positions are symmetrically arranged and have a 180° separation. Stephenson et al. in U.S. Pat. No. 5,212,752 disclose a connector that has enhanced provisions for tuning eccentricities of an optical fiber core or fiber receiving passageway in a ferrule. Stephenson et al. minimize the influence of eccentricity by providing an SC-type fiber connector that may be united to a second fiber in a variety of fixed alignments. A series of trial connections, made using alternate fixed fiber alignments, eventually yields the lowest loss connection for a given connector. The limited rotational orientation capability in the Nagase and Stephenson connector designs does not provide sufficiently accurate rotational orientation for PM or PZ fiber.

In designing a connector for non-cylindrically symmetrical fibers, precise control of rotational orientation of each fiber in the connection is critically important. This subject is discussed in some detail by Nagase et al. in U.S. Pat. No. 5,216,733, which discloses a method for aligning a fiber-bearing ferrule with a keyway formed in a ring-shaped flange and thereafter bonding the ferrule in position relative to this flange. Fiber alignment is made while observing the polarization orientation of light passing through the polished end of the optical fiber. Installation of the ferrule in the plug housing is limited to one of two rotationally equivalent positions determined when the internal key on the housing mates with the keyway of the ferrule flange.

The connector design described in the '733 patent requires that the polarization axis of the fiber first be identified using an assembly apparatus 121 (see FIG. 14 of the '733 patent). A ring-shaped alignment flange 105 containing two radially opposed keyways 108 is pressed onto a holding part 104 of a ferrule body 103 in which a non-cylindrically symmetrical optical fiber 101 is retained (see FIGS. 4–5 of the '733 patent). The polarization axis of the fiber 101 is thus rotationally aligned with the keyways 108 in the ring-shaped flange 105. As shown in FIG. 16 of the '733 patent, to assemble the connector the ferrule 100 with attached flange 105 is then inserted into a plug housing 161 and the keyways 108 engage a key 162 in the housing. The plug housing 161 may also include a spring 163, which compresses the flange 105 so the ferrule 100 is biased toward an end region of the plug housing.

In the connector design described in Nagase '733, once the ferrule/ring-shaped flange assembly is inserted into the housing, it is rotationally fixed with respect to the housing when the keyways 108 engage the key 162 in the housing. The polarization axis of the fiber cannot be further rotationally adjusted with respect to any internal or external alignment feature on the housing (col. 8, lines 15–20). Therefore, the accuracy of the rotational orientation of the fiber is limited by the lack of rotational adjustability of the fiber polarization axis following the assembly of the connector.

The rotational orientation technique in Nagase also requires that the ferrule/flange assembly be separate from the remaining connector components during the fiber insertion and polarization tuning portions of the termination practice. The multi-step rotational alignment procedure required in the Nagase '733 design introduces the following multiple opportunities for rotational error:

Rotational error induced by the alignment process.

Rotational error induced by tolerances between the ring-shaped alignment flange and the fixture.

Rotational error induced during the ring-shaped alignment flange installation process.

Rotational error induced by tolerances between the ring-shaped alignment flange and the internal key in the connector.

Rotational error induced by tolerances between the internal and external keys on the connector.

The accumulation of error due to the sum of manufacturing tolerances and alignment tolerances/errors in a series of operations, sometimes referred to as "tolerance stacking," further limits the accuracy of the rotational orientation of the fiber.

In addition, the Nagase connector is very difficult to terminate onto typical cable constructions because many of the connector components will not fit up the cable (see FIG. 1 of the present application.). As illustrated in FIG. 1, to attach the Nagase connector to an optical fiber cable 200 having a jacket including reinforcing strands 202 and a buffer 203, the fiber must be stripped and its bare terminal end 101 inserted into the ferrule 100. The alignment flange 105 is fixed on ferrule 100 as described above, and the ferrule/flange assembly must be inserted into the housing 161 with the helical spring 163 until the keyways 108 (not shown) in the alignment flange are engaged with either of the rotationally equivalent keys 162 in the housing. The reinforcing strands 202 of the cable jacketing are then wrapped around the housing 161 and secured with a crimp sleeve 204. The housing may then be engaged with front and rear connector body portions 206A, 206B with an associated knurled coupling nut 208. A rubber boot 209 relieves bending strain on the cable 200 in the area around the crimp ring 204.

Any design requiring the installer to slide large numbers of components onto the cable in the proper order, and in the correct orientation, will adversely affect the overall connector installation yield by offering multiple opportunities for error.

SUMMARY OF THE INVENTION

The present invention is a connector for non-cylindrically symmetrical optical elements, particularly optical fibers, which provides improved control of rotational orientation for highly accurate fiber-to-fiber alignment. This highly accurate alignment is achieved by locking the optical fiber at an optimal angle relative to an external rotational orientation reference on the plug housing in a single step within a fully assembled connector.

In one embodiment, the present invention provides a connector subassembly which includes a holding member for a terminal end of a non-cylindrically symmetrical optical fiber having a polarization axis. The holding member includes at least one alignment feature, which is adapted to engage a complimentary alignment feature in an inner sleeve member. The inner sleeve member is adapted to slideably engage the longitudinal bore of a generally cylindrical housing. The structure of the housing may vary widely depending on the intended application, but preferably the housing is selected from the industry standard FC or SC-types described above.

After the optical fiber is rotationally fixed in the holding member and its polarization axis is identified, the inner sleeve member is freely rotatable about the longitudinal axis of the housing in the bore to rotationally align the polarization axis of the optical fiber at an optimal angle with respect to a fixed, exposed rotational orientation reference on an external surface of the housing. When the rotational alignment is complete, the inner sleeve member may be locked to the housing with a locking means.

If desired, the connector subassembly, with the polarization axis of the optical fiber clearly indicated by the position of the external feature on the housing, may readily be fitted with an appropriate SC or FC-type latching member. The optical fiber cable with the attached connector may then be attached to an appropriate terminal for interconnection with another optical device.

The present invention may include means for biasing the holding member toward an appropriate end of the housing. If desired, the inner sleeve member may be rotated with respect to the housing by a tool designed to engage the holding member.

In a preferred embodiment, the holding member comprises a ferrule and a collar member adapted to rotationally retain the ferrule. The ferrule includes an axial longitudinal passageway for the terminal end of the fiber, and the collar member includes an axial longitudinal passageway contiguous with the passageway in the ferrule. The collar member further includes at least one alignment feature, such as, for example, a longitudinal key. The alignment feature on the collar member engages a cooperative alignment feature, such as a keyway, in an inner sleeve. The inner sleeve engages the longitudinal bore of an FC or SC-type housing.

After the ferrule is rotationally fixed in the collar member, and the collar member is engaged with the inner sleeve, the inner sleeve member may be inserted into the housing and freely rotated about the longitudinal axis of the housing bore. Following assembly of the connector components, the optical fiber may be rotationally fixed in the ferrule, and the polarization axis of the optical fiber may be rotationally aligned at an optimal angle with respect to a fixed, exposed rotational orientation feature on an external surface of the housing. The inner sleeve member may then be mechanically or adhesively locked to the housing.

The connector of the invention thus allows rapid and highly precise alignment of light polarization modes between interconnected fibers. The fiber insertion and bonding process can be accomplished in much the same way as with any typical connector installation, and the fiber polishing and other steps required before the rotational alignment can thus be completed on an assembled connector, rather than a bare ferrule, or an unassembled ferrule collar, as in the prior art.

The connectors previously employed to join non-cylindrically symmetrical fibers, such as the design described in the '733 patent to Nagase, required fiber alignment prior to connector assembly and a large number of piece parts. In contrast, the present invention requires that the polarization alignment be accomplished within the fully assembled connector, with a relatively smaller number of piece parts. This alignment procedure reduces the opportunities for error to the following:

Rotational error induced by the alignment process.

Rotational error induced by tolerances between the alignment feature on the collar member and the sleeve member inserted into the housing.

The connector of the invention eliminates error induced by keyway installation since its alignment feature is manufactured as an integral part of the fiber holding member. Therefore, the present invention reduces the rotational alignment errors inherent in the pre-alignment process required in the connectors of the prior art.

The present invention allows the connector to be fully assembled during the termination procedure, thus simplifying installation on typical cables (see FIG. 4A). The present connector may also be completely factory assembled, which increases the potential yield of the system by removing opportunities for error.

The present invention also includes a method for connecting a second non-cylindrically symmetrical optical element to a first optical element having a first polarization axis, which includes the steps of:

(a) providing for the second optical element a holding member with at least one alignment feature;

(b) engaging an alignment feature in the holding member with at least one cooperative alignment feature in an inner sleeve member;

(c) engaging the inner sleeve member with a housing having an internal surface with a longitudinal bore adapted to receive the inner sleeve member and an external surface comprising an external rotational alignment feature;

(d) rotationally fixing in the holding member a second optical element having a second polarization axis;

(e) rotating the inner sleeve member in the bore to rotationally align the second polarization axis at an optimal angle with respect to the external rotational alignment reference on the housing;

(f) fixing the inner sleeve member with respect to the housing; and (g) rotationally orienting the external feature on the housing with respect to the first polarization axis of the first optical element.

In a preferred embodiment, the invention includes a method for connecting a second non-cylindrically symmetrical optical fiber to a first optical fiber with a first polarization axis, which includes the steps of:

(a) rotationally fixing a ferrule in a collar member, wherein the collar member includes at least one alignment feature;

(b) engaging an alignment feature in the collar member with a cooperative alignment feature in an inner sleeve member adapted to engage said alignment feature;

(c) inserting said collar member and sleeve member in a housing having an internal surface with a longitudinal bore adapted to receive the inner sleeve member and an external surface comprising an external rotational orientation reference;

(d) inserting a second optical fiber with a second polarization axis into the collar member and into the ferrule, and rotationally fixing the second fiber in the ferrule;

(e) rotating the inner sleeve member in the bore to rotationally align the second polarization axis at an optimal angle with respect to the external orientation feature on the housing;

(f) adhesively fixing the inner sleeve member with respect to the housing; and (g) rotationally orienting the external reference with respect to the first polarization axis of the first optical fiber.

The connectors in the embodiments described above may be utilized to connect PM or PZ optical fibers to one another or to various optical elements. However, one of ordinary skill in the art would be aware that the connectors of the invention may also be used to retain and interconnect any optical element with non-cylindrically symmetrical internal geometry, whether birefringent or not, such as optical fibers with elliptical cores, multiple cores, offset cores, and the like.

BRIEF DESCRIPTION OF THE DRAWINGS

FIG. 4A is a cross-sectional view of an assembled FC-type optical fiber connector of the invention;

FIG. 4B is an exploded cross-sectional view of an FC-type optical fiber connector assembly of the invention;

DETAILED DESCRIPTION OF THE INVENTION

Figure 2:
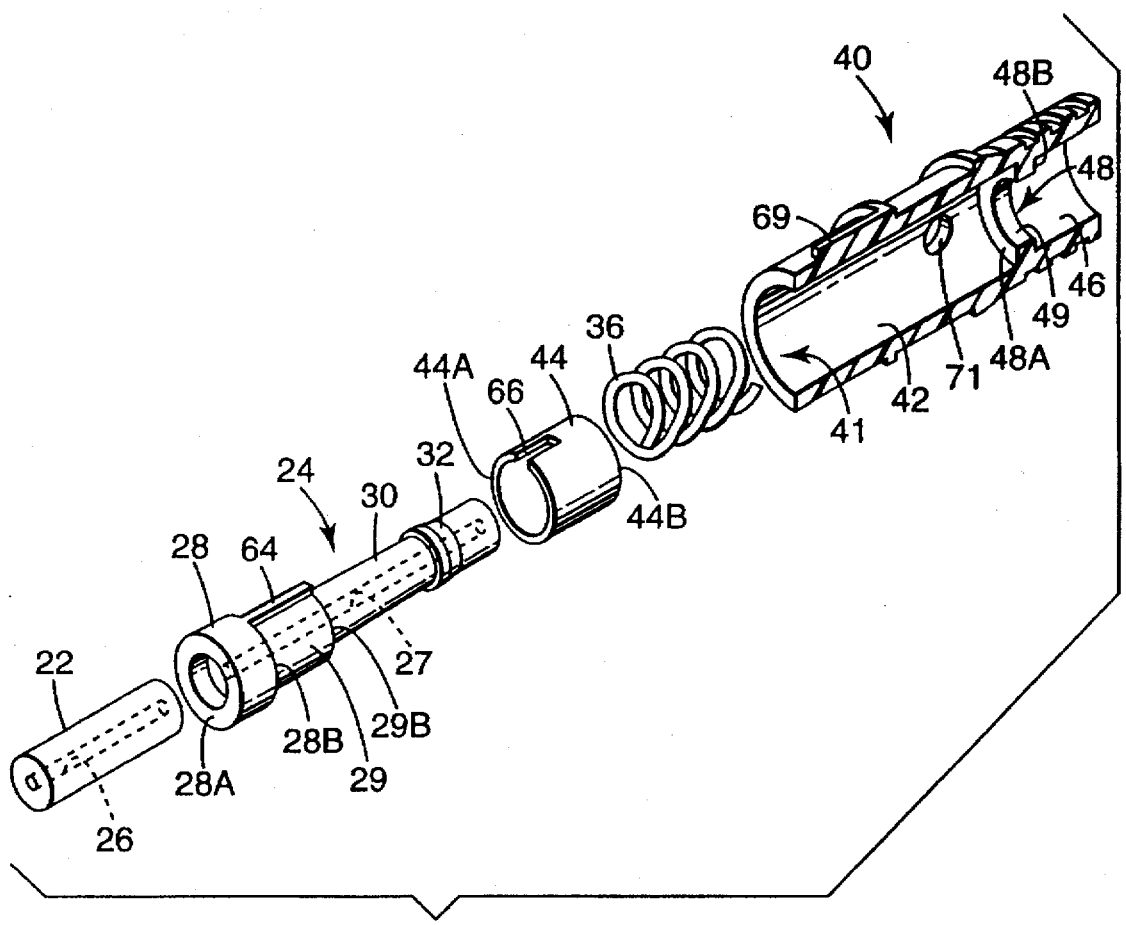
FIG. 2 is an exploded view, partially in section, of the components of an optical fiber connector subassembly of the invention.

FIG. 2 is an exploded view of an embodiment of an optical fiber subassembly of an optical fiber connector of the present invention. The subassembly includes as a first principal component a holding member for an optical fiber, which preferably comprises a ferrule 22 and a collar member 24 adapted to rotationally retain the ferrule 22. The collar member 24 includes at least one alignment feature, such as, for example, a key 64, which engages a cooperative alignment feature, such as, for example a keyway 66, in a second principal component of the subassembly, an inner sleeve member 44. The third principal component of the subassembly is a tubular housing 40. The housing may be an FC-type or an SC-type, and includes a stepped internal bore 41 adapted to engage the holding member.

The ferrule 22, preferably made of a ceramic material, includes a longitudinal internal passageway 26 adapted to retain a terminal end of a non-cylindrically symmetrical optical fiber, such as a PM or PZ optical fiber (not shown). The ferrule 22 is rotationally retained by the collar member 24, which is made up of three axially aligned segments: a ferrule-engaging cup portion 28, a barrel portion 29 and a stem portion 30. The cup portion includes a base 28B and an open end 28A. A first end (not shown) of the barrel portion is attached to the base 28B of the cup portion, and the generally tubular stem portion 30 attached to a base 29B of the barrel portion 29. The collar member includes a longitudinal axial passageway 27 which is contiguous with the passageway in the ferrule 22.

The collar member 24 includes at least one alignment feature 64, in this embodiment the generally longitudinal key 64 extending from the base 28B of the cup portion 28 along an exterior surface of the barrel portion 29. The arrangement of the key 64 along the barrel portion 29 of the collar member allows the assembler to easily engage the key 64 with at least one of the cooperative alignment features on the inner sleeve 44, such as the keyway 66.

The stem portion 30 of the collar member includes a retaining means, such as, for example, a tapered flange or ridge 32, on its exterior surface at the end of the stem portion distal the cup portion 28 of the collar member.

The FC-type tubular housing 40 illustrated in FIG. 2 has an internal wall with a stepped bore 41. A large diameter region 42 of the bore 41 at a first end of the housing 40 has a diameter sufficient to slideably engage the cup portion 28 of the collar member 24 and the inner sleeve member 44. A small diameter region 46 of the bore at the second end of the housing 40 has a diameter sufficient to slideably engage the stem portion 30 of the collar member 24. A shoulder 48 with opposed faces 48A and 48B lies between the large diameter region 42 and the small diameter region 46 in the housing bore, and includes a passageway 49 of sufficient diameter to provide an interference fit with the tapered flange 32 on the stem portion 30. An external surface of the housing 40 further includes at least one rotational orientation reference 69, which serves to properly orient a completed connector assembly when mated to a terminal or device (not shown). The external feature 69 may be located anywhere on the external surface of the housing 40 which is physically accessible during the rotational alignment procedure. The actual structure of the reference may vary widely depending on the housing design, and may, for example, be a ridge, a flange, or a regular feature of the external surface of the housing. A biasing means, such as, for example, a helical spring 36, may be inserted in the tubular housing 40 between the base 29B of the barrel portion of the collar member and the first face 48A of the shoulder 48 to maintain pressure behind the collar member to resist longitudinal movement of the collar member in the bore 41.

The inner sleeve 44 with a first end 44A and a second end 44B has an outside diameter sufficient to slideably engage the larger diameter region 42 of the housing bore 41. The outside diameter of the inner sleeve 44 makes possible rotation of the sleeve about the longitudinal axis of the housing 40 in the large diameter region 42. The second end 44B of the inner sleeve 44 abuts the face 48A of the shoulder 48. The inner sleeve 44 is adapted to engage the alignment feature 64 on the collar member 24, and in the present embodiment includes at least one cooperative alignment feature, the longitudinal keyway 66 extending from the first end 44A, for this purpose. The inner sleeve 44 may include a single keyway as illustrated, or may include multiple keyways at selected angles of separation about the longitudinal axis of the housing 40. The inner sleeve 44 has an inside diameter sufficient to slideably engage the barrel portion 29 of the collar member 24, and when so engaged, and spring 36 fully compressed, the first end 44A abuts the base 28B of the cup portion 28. The key 64 and its corresponding keyway 66 must intermate precisely to prevent rotation of the collar 24 in the bore 41 of the housing 40 and thereby maintain rotational alignment and the highest level of fiber-to-fiber polarization preservation when fibers are connected.

Figure 1:
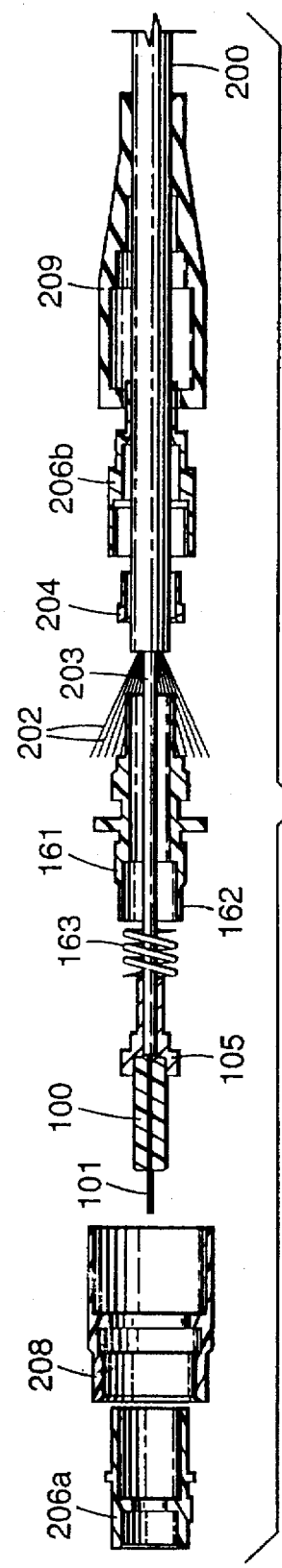
FIG. 1 is an exploded view of the optical fiber connector described in U.S. Pat. No. 5,216,733 to Nagase et al. as it might appear prior to assembly on a conventional optical fiber cable.
Figure 3A:
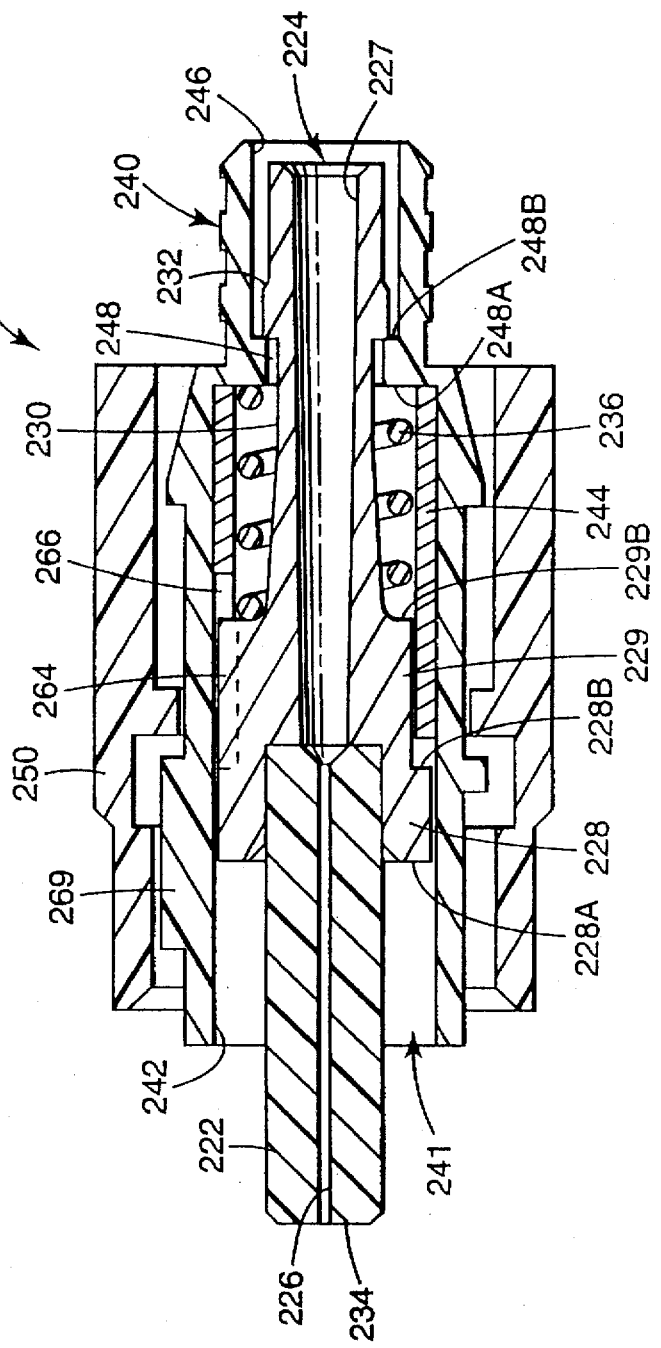
FIG. 3A is a longitudinal cross section of an assembled FC-type optical fiber connector of the invention.

FIG. 3A is a cross-sectional view of the optical fiber connector 210 with an FC-type housing 240. The ferrule 222 is rotationally secured in the cup portion 228 of the collar member 224 by any appropriate means, for example, with a suitable adhesive or by a press fit, and extends from the open end 228A of the cup portion. The alignment feature on the collar member, longitudinal key 264, is intermated with the cooperative alignment feature in the inner sleeve 244, keyway 266. Once the collar and sleeve are intermated and positioned inside the large diameter region 242 of the housing bore, the collar has some limited freedom to move longitudinally in the bore 241 when the connector 210 is connected to an optical element or a terminal and force is applied to an exposed end 234 of the ferrule 222. The helical spring 236 acts between the base region 229B of the barrel portion of the collar member and the first shoulder face 248A to resist excessive longitudinal movement and preserve contact between the exposed ends of the connected fibers or elements. The diameter of the smaller region 246 of the housing bore permits the stem portion 230 of the collar member 224 to slide relative to the longitudinal axis of the housing 240. However, movement of the stem portion 230 toward the larger diameter region 242 of the housing bore is restricted after the tapered flange 232 snaps into place and engages the second face 248B of the shoulder 248.

Inside the connector 210, a stripped (i.e. de-jacketed) bare portion of the optical fiber (not shown) may be inserted into the passageway 227 in the collar member 224 and into the contiguous passage 226 in the ferrule 222. When the connector 210 is fully assembled the optical fiber may be secured in the ferrule passageway 226 with a suitable adhesive. The FC-type housing 240 in FIG. 3A may be engaged with an appropriate FC-type latching member 250.

Figure 3B:
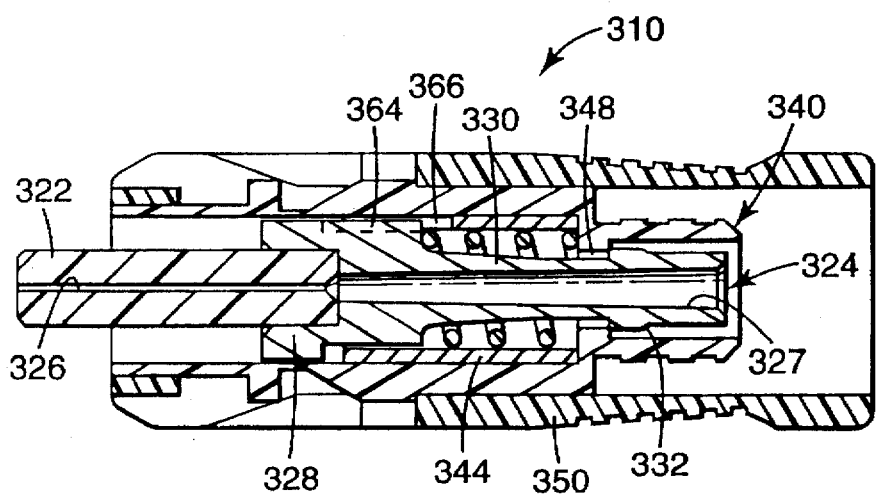
FIG. 3B is a longitudinal cross section of an assembled SC-type optical fiber connector of the invention.

Referring to FIG. 3B, in another embodiment of the invention an SC-type connector 310 may be constructed with an SC-type housing 340 and an appropriate SC-type latching means 350. In the SC-type housing, the rotational alignment reference may simply be a flat portion on the external surface of the housing body.

The components comprising embodiments of the optical fiber connector of the invention have been described, and reference is made to FIGS. 4A and 4B to consider the functional aspects of the connector that allow fine-tuning of polarization axis alignment according to the present invention. In operation, the ferrule 522 is rotationally fixed, preferably with an adhesive, in the cup portion 528 of the collar member 524. The ferrule 522 may be randomly rotationally oriented relative to the collar member 524. Next, the key 564 on the collar member 524 is inserted into the keyway 566 of the inner sleeve 544, and the internal surface of the inner sleeve 544 is slideably engaged with the external surface of the barrel portion 528 of the collar member. The collar member 524 with intermated ferrule 522 (hereinafter referred to as the ferrule collar assembly), and inner sleeve 544 may then be inserted into the housing bore 541, along with the spring 536, until the tapered flange 532 clears the shoulder 548, snaps into place, and the flange 532 engages the second face 548B of the shoulder.

In the alternative, it will be evident to one of ordinary skill in the art that the inner sleeve 544 may be provided in the larger diameter region 542 of the internal bore of the housing and with its second end 544B abutting the first face 548A of the shoulder 548. In such a case the collar member 524 with an intermated ferrule 522 is inserted into the housing 540 along with the spring 536, and rotated about the longitudinal axis of the collar so the key 564 engages the keyway 566 in the inner sleeve 544. The collar member and intermated ferrule are then inserted into the inner sleeve 544 until the tapered flange 532 clears the shoulder 548, snaps into place, and the flange 532 engages the second face 548B of the shoulder.

A terminal end 570 of a non-cylindrically symmetrical optical fiber having a jacket 572 with reinforcing strands 574 and a buffer 576, is stripped, by mechanical or chemical means well known in the art. The terminal end 570 of the fiber is inserted in the housing 540. Once through the housing 540, the terminal end 570 of the fiber may pass into the collar passageway 527, which may be tapered to facilitate insertion, if desired. The fiber then passes into the contiguous passageway 526 in the ferrule 522, and its advancing terminal end protrudes from the exposed end 534 of the ferrule 522.

The terminal end 570 of the fiber is then rotationally fixed, preferably with an adhesive, in the ferrule passageway 526. The protruding fiber is then cleaved and its end is polished according to procedures well known in the art.

Once the fiber has been rotationally fixed in the ferrule, polished, and its polarization axis identified according to procedures well known in the art, the ferrule collar assembly may be rotated about the longitudinal axis of the housing in the housing bore. The rotation in the housing bore 541 of the ferrule collar assembly with attached inner sleeve may be performed by hand, or by a suitably designed tool which engages the cup portion 528 of the collar member 524 (see, for example, FIG. 6).

The ferrule collar assembly is rotated within the housing 540 until the plane of polarization of the light exiting the fiber 570 at the exposed ferrule endface 534 is optimally rotationally aligned with respect to the external key 569. The optimal rotational orientation angle of the fiber polarization axis with respect to the external key may be selected from any desired orientation angle, such as, for example, 0°, 45° or 90°. Thus, the fiber insertion and bonding process can be accomplished in much the same way as with any typical connector installation. Fiber polishing and other steps required before the rotational alignment can be completed on an assembled connector, rather than a bare ferrule, or an unassembled ferrule collar, as in conventional connectors. In addition, as discussed above, the flexibility to align the plane of polarization of the fiber to the rotational alignment reference 569 in a pre-assembled connector in a single step, using the housing itself as the alignment fixture, greatly reduces the alignment errors due to "tolerance stacking."

After this rotational alignment step is completed, locking means may rotationally fix the ferrule collar assembly into position with respect to the housing to prevent further rotation of the ferrule collar assembly in the housing bore. The locking means may include mechanical devices, or simply application of a drop of adhesive onto the inner sleeve 544 through an access orifice 571 in the housing 540 (see FIG. 4B).

Following the locking procedure, the housing is inserted into the appropriate latching member 550, which may be selected from FC-type and an SC-type. A crimp sleeve 552 and a boot member 516 may be then by applied to complete the connector assembly. The connector assembly may then be attached to an appropriate terminal or device to connect the PM fiber with another PM fiber or optical element.

Figure 5:
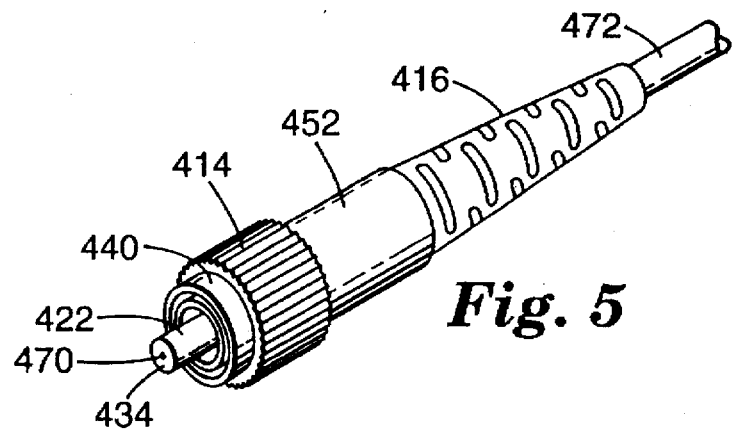
FIG. 5 is an external perspective view of an FC-type connector assembly of the invention.

In the FC-type connector shown in FIG. 5, a screw thread formed on the internal wall of a knurled ring 414 of the FC-type latching member mates with a corresponding thread on the component, i.e. cable, terminal or optical element, which receives the optical cable 472.

Figure 6:
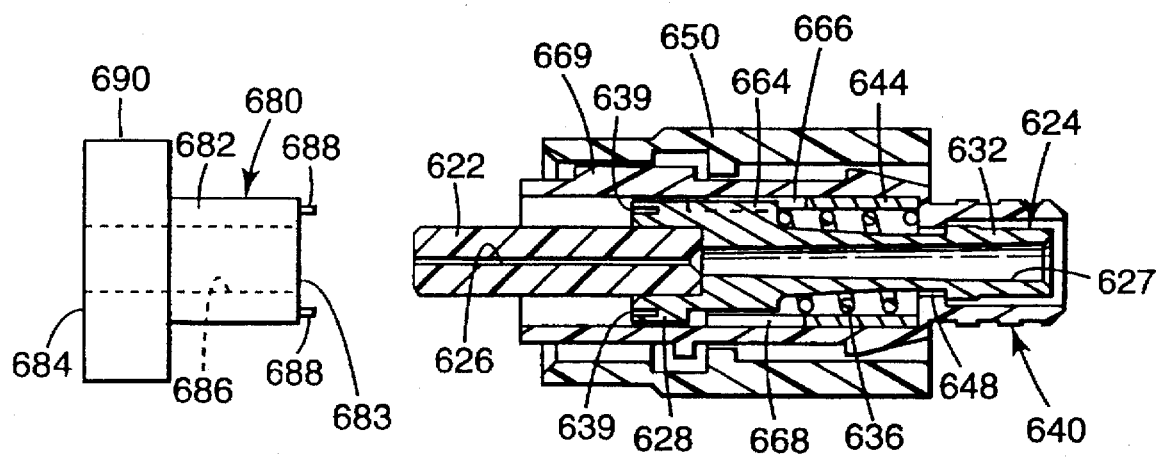
FIG. 6 is a cross-sectional view of an FC-type connector of the invention adapted for use with an alignment tool.

As illustrated in FIG. 6, if a tool is to be used to rotate the ferrule collar assembly in the bore, protruding or indented interlocking features 639 for engaging the tool may be provided on an exposed area of the cup portion 628 of the collar member 624. The design of the rotation tool will vary widely depending on the features and shape of the collar member, but one embodiment of such a tool is shown in FIG. 6. The tool 680 would likely include a generally cylindrical body 682 with a first end 683 and a second end 684. The first end 683 has an outer diameter adapted to slideably engage the larger diameter region of the bore of the housing, an axial passage 686 adapted to receive the ferrule 622, and at least one protruding or indenting interlocking feature 688. The shape and design of the projection 688 may vary widely depending on the features of the cup portion 528 of the collar member, and may be selected from pins, knife edges, keys, notches and the like adapted to engage the features in the collar member. A suitably designed handle (not shown) may be attached to the second end 684 of the cylindrical body so an assembler may rotate the ferrule collar assembly in the bore.

In initial fiber alignment, error may result from alignment technique limitations or equipment limitations. Depending on the skill of the assembler, up to several degrees of alignment error may occur during the alignment procedure. For example, when a PM or PZ optical fiber is mounted in the ferrule assembly, assembler error or manufacturing inaccuracies will cause the fiber to be rotationally misaligned with respect to the alignment reference by some small angle $\Theta$. This small rotational error will degrade the polarization performance of the connector when it is intermated with a terminal or another non-cylindrically symmetrical optical element.

To improve alignment performance, as explained in U.S. Pat. No. 5,633,970 to Olson et al., incorporated by reference herein, this alignment error may be eliminated, or at least partially negated, if alignment features are incorporated into the connector design which are asymmetrically arranged with respect to an alignment reference on the exterior of the connector. Each feature is offset by a small acute angle δ with respect to a transverse axis of the inner sleeve, so the features are then spaced apart by an rotational separation of 180°–2δ with respect to the axis of the connector. Thus, when the rotationally fixed optical fiber is inserted into the connector housing and intermated with an alignment feature, the angle of the polarization axis of the fiber with respect to the external alignment reference will be β=Θ or β=Θ+2δ, depending on which alignment feature is selected. The assembler may select the alignment feature which minimizes β, and reduces or eliminates the alignment error Θ. Thus, the present invention may be constructed with asymmetric features to provide the assembler a "second chance" following the initial alignment procedure to minimize rotational alignment errors and optimize alignment accuracy.

Figure 7:
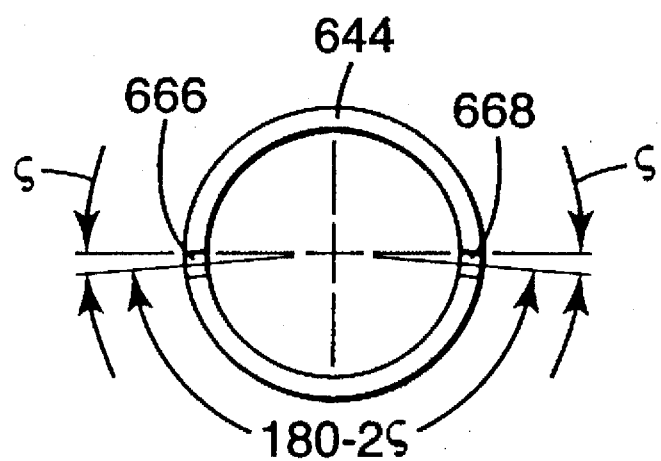
FIG. 7 is a front view of an inner sleeve member of the invention with multiple asymmetric keyways.

For example, an embodiment of the connector of the invention may include a second keyway 668 adapted to receive the key 664 in the collar member 624 (see FIGS. 6–7). The second keyway 668 is preferably provided in the inner sleeve member 644, but, in an alternate construction, two asymmetric keyways may be provided on the collar member a single key in the inner sleeve member.

In the embodiment shown in FIGS. 6–7, the keyways 666 and 668 are arranged asymmetrically with respect to the longitudinal axis of the housing. The first keyway 666 is offset relative to the second keyway 668 at an angle which is slightly greater or less than 180°. Accommodation of most operator error requires a range of offset Θ with respect to the external reference feature 669 from about 0.5° to about 5°, so the opposed keyways 666 and 668 are preferably rotationally separated by about 175° to about 179.5° with respect to the longitudinal axis of the housing 640, i.e. δ preferably ranges from about 0.25° to about 2.5°.

If the polarization axis of the fiber is rotationally aligned with respect to the external alignment reference 669, and some alignment error with respect to the alignment reference remains after the inner sleeve member is fixed with respect to the housing, the key 664 on the collar member may be disengaged from the inner sleeve member and rotated to engage either of the cooperative keyways 666 or 668 in the inner sleeve member 644. Thus, the collar member may be positioned in one of two possible rotational orientations. The assembler may select a first keyway, such as keyway 666, insert the collar member in the bore of the housing, engage the key 664 with the first keyway in the inner sleeve 644, and determine the accuracy of the rotational alignment of the polarization axis of the fiber with respect to the reference 669. The collar member may then be disengaged from the first selected keyway, rotated about the longitudinal axis of the housing, and the key 664 may be engaged with the second keyway 668 in the inner sleeve member 644. The accuracy of the rotational alignment of the polarization axis of the fiber with respect to reference 669 may again be evaluated. The rotational alignment in the second keyway 668 is compared with the rotational alignment in the first keyway 666, and the keyway is selected which provides the best rotational alignment with respect to the reference 669 and optimum optical performance for the connector. By testing both keyway positions during assembly of the connector, one position may be identified which provides optimum polarization preservation. This allows fine-tuning of fiber alignment and thereby partially overcomes errors introduced during initial alignment.

If this "second chance" alignment procedure with multiple keyways is desired, the sleeve 644, collar member 628, and key 664 can be dimensioned such that after the connector has been assembled and the freedom to withdraw the ferrule collar assembly from the tubular housing 640 is limited by the ridge 632 engaging the shoulder 648 in the housing bore, the collar member 624 and the housing 640 may still be sufficiently deflected to rotate the key 664 from one keyway 666 to another (e.g., 668).

While the embodiments of the devices exemplified above are directed to the interconnection of non-cylindrically symmetrical optical fibers, one of ordinary skill in the art would be aware that modifications of these devices to interconnect other optical fiber elements would also be within the scope of the present invention.

What is claimed is:

1. A connector subassembly for non-cylindrically symmetrical optical elements, comprising:

a holding member for an optical element, wherein said holding member comprises at least one alignment feature;

an inner sleeve member comprising at least one cooperative alignment feature adapted to engage the alignment feature on the holding member; and a housing with a longitudinal bore adapted to receive said holding member and said inner sleeve member, and an external surface comprising a rotational alignment reference;

wherein said inner sleeve member, when engaged with the holding member and inserted into the bore in the housing, is freely rotatable with respect to said housing to rotationally align said optical element at a predetermined angle with respect to said reference on the housing.

2. A connector subassembly as claimed in claim 1, wherein said optical element is an optical fiber, and said holding member comprises a ferrule adapted to rotationally retain the optical fiber and a collar member adapted to rotationally retain the ferrule.

3. A connector subassembly as claimed in claim 1, further comprising locking means to rotationally fix the inner sleeve member in the housing.

4. A connector subassembly as claimed in claim 1, wherein the alignment feature on the holding member is a single key, and the cooperative alignment feature in the inner sleeve member is selected from at least one keyway in the inner sleeve member.

5. A connector subassembly as claimed in claim 3, wherein said locking means is at least one of an adhesive joint and a mechanical interlock.

6. A connector subassembly for non-cylindrically symmetrical optical fibers, comprising:

a ferrule comprising a longitudinal passageway for a terminal end of a non-cylindrically symmetrical optical fiber with a polarization axis;

a collar member adapted to rotationally retain said ferrule, wherein said collar member has at least one alignment feature;

an inner sleeve member comprising at least one cooperative alignment feature adapted to engage an alignment feature on said collar member; and a housing comprising an internal surface with a longitudinal bore adapted to receive said inner sleeve member and an external surface comprising a rotational alignment reference;

wherein said inner sleeve member, when engaged with the collar member and inserted into the bore in the housing, is freely rotatable in said bore to rotationally align the polarization axis of the fiber at a predetermined angle with respect to the reference on the housing.

7. A connector subassembly as claimed in claim 6, further comprising locking means to rotationally fix the inner sleeve member with respect to the housing.

8. A connector subassembly as claimed in claim 6, wherein said alignment feature in said collar member is at least one longitudinal key, and wherein said sleeve member comprises at least one longitudinal keyway adapted to engage the key.

9. A connector subassembly as claimed in claim 6, wherein said reference is a longitudinal projection.

10. A connector sub assembly as claimed in claim 6, wherein said bore is stepped, and comprises a large diameter region at a proximate end of said housing, and a small diameter region at a distal end of said housing, the interior surface of said housing further comprising a shoulder between the large diameter region of the bore and the small region thereof.

11. A connector subassembly as claimed in claim 10, wherein said collar member comprises:
a cup portion with a base and an open end,
a barrel portion with a first end and a second end, wherein the first end of said barrel is attached to the base of the cup portion, and
a generally tubular stem portion with a first end and a second end, wherein the first end of said stem portion is attached to the second end of said barrel portion;
wherein said cup portion further comprises at least one elongate key extending from the base thereof and longitudinally along an external surface of said barrel portion.

12. A connector subassembly as claimed in claim 11, wherein the cup portion, the barrel portion and the stem portion of said collar member are axially aligned, and wherein an axial passageway extends continuously from the base of said cup portion through said barrel portion and said stem portion.

13. A connector subassembly as claimed in claim 11, wherein the cup portion of the collar member has an outside diameter sufficient to slideably engage the large diameter region of the bore, and the stem portion has a diameter sufficient to slideably engage the small portion of said bore.

14. A connector subassembly as claimed in claim 11, wherein the stem portion of said collar member further comprises an external retention feature proximal the second end thereof to engage the shoulder of said housing.

15. A connector subassembly as claimed in claim 14, wherein said external retention feature on the stem portion of the collar member is a tapered circumferential flange.

16. A connector subassembly as claimed in claim 12, wherein the cup portion of the collar member is adapted to engage and rotationally fix the ferrule, and wherein the longitudinal passageway in the ferrule is contiguous with the passageway in the collar member.

17. A connector subassembly as claimed in claim 11, wherein said sleeve member has a generally cylindrical structure with an inside diameter sufficient to slideably engage an outer surface of the barrel portion of the collar member, an outside diameter sufficient to slideably engage the housing in the large diameter region of the bore, a first end adapted to abut the base of the cup portion of the collar member and a second end adapted to abut the shoulder in the housing, and at least one keyway extending longitudinally from the first end of the sleeve member and adapted to receive the key on the cup portion of the collar member, wherein said sleeve member slideably engages the key and the barrel portion of the collar member.

18. A connector subassembly as claimed in claim 11, wherein said cup portion of the collar member is adapted to engage a tool for rotating the collar member with respect to the housing.

19. A connector subassembly as claimed in claim 10, further comprising means for biasing said collar member toward the proximate end of the housing.

20. A connector subassembly as claimed in claim 19, wherein the biasing means is a helical spring.

21. A connector subassembly as claimed in claim 11 further comprising a helical spring, wherein the spring resides inside said sleeve member, and wherein a first end of said spring abuts the second end of the barrel portion of the collar member, and a second end of said spring abuts the shoulder of the housing.

22. A connector subassembly as claimed in claim 7, wherein said locking means comprises an adhesive bond between the inner sleeve and said housing.

23. A connector subassembly as claimed in claim 7, wherein said housing further comprises an orifice between the interior surface and the exterior surface thereof, and wherein said locking means comprises an adhesive bond at said orifice between the inner sleeve and said housing.

24. A connector subassembly as claimed in claim 7, wherein said locking means comprises a mechanical coupling between the inner sleeve and the housing.

25. A connector subassembly as claimed in claim 6, wherein said predetermined angle is selected from the group consisting of 0, 45 and 90 degrees.

26. A connector subassembly as claimed in claim 6, wherein the alignment feature on the collar member is a single longitudinal key, and wherein the inner sleeve member comprises a single keyway adapted to receive the key in the collar member.

27. A connector subassembly as claimed in claim 6, wherein the inner sleeve member comprises a pair of keyways each adapted to receive a single key in the collar member, and wherein the keyways are spaced about 175 degrees to about 179.5 degrees apart about a longitudinal axis of said collar member.

28. A connector subassembly for polarization maintaining (PM) optical fibers, comprising:
a ferrule comprising a longitudinal passageway for a terminal end of a PM optical fiber with a polarization axis;
a collar member adapted to rotationally retain said ferrule, wherein said collar member comprises at least one longitudinal key;
an inner sleeve member comprising at least one longitudinal keyway adapted to engage the key of said collar member;
a hollow housing comprising an internal surface with a stepped longitudinal bore, wherein the bore has a large diameter region adjacent a proximate end of the housing adapted to receive said inner sleeve member, said housing further comprising an external surface with a rotational alignment reference;
means for biasing said collar member toward the proximate end of the housing; and
means for locking the inner sleeve member into rotational alignment with the housing;

wherein said inner sleeve member, when engaged with the collar member and inserted into the bore of the housing, is freely rotatable in said bore to align the polarization axis of the fiber at a predetermined angle with respect to the rotational alignment reference, and is subsequently locked into rotational alignment with said locking means.

29. A connector subassembly as claimed in claim 28, wherein said locking means comprises an adhesive bond between the inner sleeve and said housing.

30. A connector subassembly as claimed in claim 28, wherein said housing further comprises an orifice between the interior surface and the exterior surface thereof, and wherein said locking means comprises an adhesive bond at said orifice between the inner sleeve and said housing.

31. A connector subassembly as claimed in claim 28, wherein said locking means comprises a mechanical coupling between the inner sleeve and the housing.

32. A connector subassembly as claimed in claim 28, wherein the means for biasing is a helical spring.

33. A connector subassembly as claimed in claim 28, wherein the interior surface of the housing further comprises a small diameter region at a distal end of said housing, the interior surface of said housing further comprising a shoulder between the large diameter region of the bore and the small region thereof.

34. A connector subassembly as claimed in claim 33, wherein said collar member comprises:
  a cup portion adapted to rotationally retain the ferrule, wherein said cup portion has a base and an open end, and wherein said cup portion has an outside diameter sufficient to slideably engage the large diameter region of the bore in the housing;
  a barrel portion with a first end and a second end, wherein the first end of said barrel is attached to the base of the cup portion; and
  a generally tubular stem portion with a first end and a second end, wherein the first end of said stem portion is attached to the second end of said barrel portion, and wherein the outside diameter of said stem portion is sufficient to slideably engage the small diameter portion of the bore in the housing;
wherein an axial passageway, contiguous with the passageway in the ferrule, extends from the base of said cup portion through said barrel portion and said stem portion, and a key extends from the base of the cup portion and longitudinally along an external surface of said barrel portion.

35. A connector subassembly as claimed in claim 34, wherein said stem portion further comprises a tapered circumferential flange to longitudinally secure the collar member in the housing.

36. A connector subassembly as claimed in claim 34, wherein said sleeve member has a generally cylindrical structure with an inside diameter sufficient to slideably engage an outer surface of the barrel portion of the collar member, an outside diameter sufficient to slideably engage the housing in the large diameter region of the bore, a first end adapted to abut the base of the cup portion of the collar member and a second end adapted to abut the shoulder in the housing, and at least one keyway extending longitudinally from the first end of the sleeve member and adapted to receive the key on the cup portion of the collar member, wherein said sleeve member slideably engages the key and the barrel portion of the collar member.

37. A connector subassembly as claimed in claim 28, wherein the inner sleeve member comprises a single keyway adapted to receive the key in the collar member.

38. A connector subassembly as claimed in claim 28, wherein the inner sleeve member comprises a pair of keyways each adapted to receive the key in the collar member, and wherein the keyways are spaced about 175 degrees to about 179.5 degrees apart about a longitudinal axis of said housing.

39. A connector for polarization maintaining (PM) optical fibers, comprising:
  a ferrule comprising a longitudinal passageway for a PM optical fiber having a polarization axis, wherein said device is rotationally fixed within said passageway;
  a collar member adapted to rotationally retain said ferrule, wherein said collar member comprises at least one longitudinal key;
  an inner sleeve member comprising at least one longitudinal keyway adapted to engage the key of said collar member;
  a hollow housing comprising an internal surface with a stepped longitudinal bore, wherein the bore has a large diameter region adjacent a proximate end of the housing adapted to receive said inner sleeve member, said housing further comprising an external surface with a rotational alignment reference;
  means for biasing said collar member toward the proximate end of the housing;
  means for locking the inner sleeve member into rotational alignment with the housing; and
  a crimp member for securing strengthening members of an optical fiber cable to a distal end of the housing;
wherein said inner sleeve member, when engaged with the collar member and inserted in the bore in the housing, is freely rotatable in said bore to rotationally align the polarization axis of the optical device at a predetermined angle with respect to the alignment reference on the housing, and said inner sleeve member is subsequently rotationally fixed with respect to the housing by said locking means.

40. A connector as claimed in claim 39, further comprising a latching member attached to and surrounding said housing, wherein said latching member is selected from the group consisting of an SC-type and an FC-type.

41. A connector as claimed in claim 39, further comprising a boot attached to the housing.

42. A connector providing rotational alignment of a polarization axis of a polarization maintaining optical fiber with respect to a rigidly fixed external feature of said connector, the connector comprising:
  a tubular housing comprising inner and outer surfaces, a proximate end, and a distal end, said inner surface defining a stepped internal bore with a larger diameter region at the proximate end of the housing, a smaller diameter region at said distal end of the housing, and a shoulder between the larger and smaller diameter regions of the bore, said housing further comprising an access hole between the outer surface and the larger diameter of the bore, and wherein the outer surface of the housing comprises an external rotational orientation-indicating reference;
  a rotatable inner sleeve slideably disposed within said tubular housing and abutting the shoulder on the internal surface of the housing, said sleeve having a keyway extending longitudinally toward said distal end of said tubular housing;
  a ferrule collar comprising:
    a cup portion with a base and an open end, wherein said cup portion is sized to slideably engage the larger diameter region of said internal bore, said cup portion further comprising at least one recess for engaging a rotation tool;

a barrel portion with a first end attached to the base of said cup portion, the barrel portion sized to slideably engage the inner sleeve;

a generally cylindrical stem portion attached to a second end of the barrel portion, said stem portion sized to slideably engage the smaller diameter of said internal bore;

a key adapted to slideably engage the keyway in the inner sleeve, wherein the key extends longitudinally along the barrel portion from the first end to the second end thereof, and an axial passageway for an optical fiber, said passageway extending from the base of the cup through the barrel and through the stem;

a helical spring to bias the collar toward the proximate end of the housing, wherein said spring is positioned around said stem portion of the collar, and a first end thereof abuts the second end of the barrel portion and a second end of thereof abuts the shoulder in the housing;

a ferrule with an axial passageway for adhesively securing said optical fiber, wherein said ferrule is rotationally fixed within the cup portion of the collar; and a polarization maintaining optical fiber with a polarization axis, wherein said fiber extends through the passageway in said collar and into the passageway of the ferrule, and is rotationally fixed within the passageway of the ferrule;

wherein said inner sleeve is engaged with the collar member and inserted in the bore in the housing and rotated until the polarization axis has a predetermined rotational orientation with respect to the external reference on said housing and said sleeve is then adhesively fixed to the housing at the access hole.

43. A connector assembly for polarization maintaining (PM) optical fibers, comprising:

a ferrule comprising a longitudinal passageway for a terminal end of a PM optical fiber with a polarization axis;

a ferrule collar adapted to rotationally retain said ferrule, wherein said collar has a longitudinal axial bore contiguous with the passageway in the ferrule, said collar further comprising a longitudinal key;

an inner sleeve member comprising a longitudinal keyway adapted to engage the key of said collar member;

an FC-type or SC-type housing with a first end and a second end and comprising an internal surface with a longitudinal bore, wherein said bore has a large diameter region proximal the first end of the housing adapted to receive said inner sleeve member and said collar, a small diameter region proximal the second end of the housing, and an external surface with a rotational alignment reference;

means for biasing said collar toward said first end of said housing; wherein said inner sleeve member is freely rotatable in the bore of the housing to rotationally align the polarization axis of the fiber at an predetermined angle with respect to the reference on the external surface of the housing;

means for locking the inner sleeve member to the housing to preserve the optimal angle;

a crimp member for securing strengthening members of an optical fiber cable to the second end of the housing;

a boot attached to the second end of said housing for relieving strain applied to the optical fiber cable proximate said crimp member; and a latching member attached to and surrounding said housing, said latching member selected from the group consisting of an SC-type and an FC-type.

44. A method for connecting a non-symmetrical optical fiber having a polarization axis, comprising the steps of:

(a) rotationally fixing a ferrule in a collar member, wherein said collar member has an alignment feature;

(b) inserting the alignment feature on the collar member in a cooperative alignment feature in an inner sleeve member to provide an engaged collar and sleeve member;

(c) inserting the engaged collar and sleeve member in a housing, the housing comprising an internal surface with a longitudinal bore adapted to receive said inner sleeve member, wherein the engaged collar and sleeve member is completely enclosed within the bore and freely rotatable therein, and wherein said housing further comprises an external rotational orientation reference;

(e) rotating the engaged collar and sleeve member in said bore to rotationally align the polarization axis at a predetermined angle with respect to said external rotational reference on said housing;

(f) rotationally locking said inner sleeve to said housing.

45. A method as claimed in claim 44, wherein said rotating step (e) is performed by engaging a tool in a depression in said collar member, and rotating said collar member with the tool.

46. A method as claimed in claim 45, wherein said tool comprises:

a generally cylindrical body with a first end and a second end, wherein said first end has an outer diameter adapted to engage the bore of the housing, an axial passage adapted to receive the ferrule, and at least one interlocking feature, wherein said feature is adapted to engage the depression in the collar member.

47. A method as claimed in claim 46, wherein said features are selected from the group consisting of pins and knife edges.

48. A method as claimed in claim 44, wherein in steps (c) and (d) said inner sleeve is inserted in the bore of the housing, and the alignment feature of the collar member is engaged with the alignment feature in the inner sleeve.

49. A method as claimed in claim 44, further comprising the steps of applying a crimp member for securing strengthening members of an optical fiber cable to said housing, inserting said housing into a connector body selected from the group consisting of an SC-type and an FC-type, and attaching boot to said housing proximate said crimp member to relieve strain applied to the optical fiber cable.

50. A connection system for polarization maintaining (PM) optical fibers, comprising:

(a) at least one connector subassembly, comprising:

(i) a ferrule comprising a longitudinal passageway for a terminal end of a PM optical fiber with a polarization axis, wherein said fiber is rotationally fixed within said passageway;

(ii) a collar member adapted to rotationally retain said ferrule, wherein said collar member comprises at least one longitudinal key;

(iii) an inner sleeve member comprising a longitudinal keyway adapted to engage the key of said collar member;

(iv) a hollow housing comprising an internal surface with a stepped longitudinal bore, wherein the bore has a large diameter region adjacent a proximate end of the housing adapted to receive said inner sleeve member;

(v) means for biasing said collar member toward the proximate end of the housing; and (vi) means for locking the inner sleeve member into rotational alignment with the housing;

wherein said inner sleeve member is freely rotatable in said bore to align the polarization axis at a predetermined angle with respect to a rotational alignment reference on an external surface of said housing, and said inner sleeve member is thereafter rotationally fixed with respect to the housing by said locking means;

(b) a tool for rotating the collar member with respect to said housing;

(c) crimp member for securing strengthening members of an optical fiber cable to a distal end of the housing;

(d) at least one connector body for attachment to each subassembly, wherein said connector body is selected from the group consisting of an SC-type and an FC-type; and (e) a boot for relieving strain applied to the optical fiber cable proximate said crimp member.

* * * * *